US010355857B2

(12) United States Patent
Earl

(10) Patent No.: US 10,355,857 B2
(45) Date of Patent: Jul. 16, 2019

(54) INCORRUPTIBLE PUBLIC KEY USING QUANTUM CRYPTOGRAPHY FOR SECURE WIRED AND WIRELESS COMMUNICATIONS

(71) Applicant: QUBITEKK, IN, Bakersfield, CA (US)

(72) Inventor: Dennis Duncan Earl, San Diego, CA (US)

(73) Assignee: QUBITEKK, INC., Bakersfield, CA (US)

( * ) Notice: Subject to any disclaimer, the term of this patent is extended or adjusted under 35 U.S.C. 154(b) by 207 days.

(21) Appl. No.: 14/893,480

(22) PCT Filed: May 21, 2014

(86) PCT No.: PCT/US2014/039017
§ 371 (c)(1),
(2) Date: Nov. 23, 2015

(87) PCT Pub. No.: WO2015/023332
PCT Pub. Date: Feb. 19, 2015

(65) Prior Publication Data
US 2016/0112192 A1    Apr. 21, 2016

Related U.S. Application Data

(60) Provisional application No. 61/826,926, filed on May 23, 2013.

(51) Int. Cl.
*H04L 9/08* (2006.01)

(52) U.S. Cl.
CPC .......... *H04L 9/0858* (2013.01); *H04L 9/0825* (2013.01); *H04L 9/0852* (2013.01); *G06F 2221/2107* (2013.01)

(58) Field of Classification Search
CPC ..... H04L 9/0858; H04L 9/085; H04L 9/0852; H04L 9/0819; H04L 9/0883;
(Continued)

(56) References Cited

U.S. PATENT DOCUMENTS 7,430,295 B1 * 9/2008 Pearson ................ H04L 9/0858
380/256
7,831,048 B2   11/2010 Kastella et al.
(Continued)

FOREIGN PATENT DOCUMENTS

WO       2012044855 A2    4/2012

OTHER PUBLICATIONS

M. A. Bashar, et al., "Proposal for an efficient quantum key distribution system using entanglement," 2008 11th International Conference on Computer and Information Technology, Khulna, 2008, pp. 481-485; URL http://ieeexplore.ieee.org/stamp/stamp.jsp?tp=&arnumber=4802981&isnumber=4802963 (Year: 2008).*
(Continued)

*Primary Examiner* — Saleh Najjar
*Assistant Examiner* — Feliciano S Mejia
(74) *Attorney, Agent, or Firm* — Acuity Law Group, PC; Michael A. Whittaker

(57) ABSTRACT

A hardware system and encryption method that generates encryption keys based on quantum mechanical phenomena that can be delivered directly, over public wired and wireless channels, to communicating devices. The encryption strength is derived from physical phenomena and not mathematical complexity and, therefore, is "future proof" against advances in computational power. The present invention allows pre-existing networked devices to communicate securely within a geographically defined "protection zone."

12 Claims, 3 Drawing Sheets

(58) Field of Classification Search
CPC ......... H04L 9/0825; H04L 9/28; H04B 10/70; H04B 10/85; G06F 21/31; G06F 21/602; G06F 2221/2107; H04W 12/04; H04W 12/02
USPC ....... 380/28, 44, 256, 24, 171; 713/150, 171
See application file for complete search history.

(56) References Cited

U.S. PATENT DOCUMENTS

| | | | |
|---|---|---|---|
| 8,683,192 B2* | 3/2014 | Ayling | H04L 9/0858 380/256 |
| 2005/0135620 A1* | 6/2005 | Kastella | H04L 9/12 380/256 |
| 2009/0003591 A1* | 1/2009 | Murakami | H04L 9/0852 380/28 |
| 2009/0041243 A1 | 2/2009 | Nambu | |
| 2011/0075839 A1 | 3/2011 | Noh | |
| 2011/0142242 A1 | 6/2011 | Tanaka | |
| 2012/0177201 A1* | 7/2012 | Ayling | H04L 9/0858 380/278 |
| 2013/0084079 A1 | 4/2013 | Nordholt et al. | |
| 2014/0016779 A1* | 1/2014 | Lirakis | H04L 9/0852 380/256 |
| 2014/0233739 A1* | 8/2014 | Grice | H04L 9/0855 380/278 |

OTHER PUBLICATIONS

Extended European Search Report issued in EP 14836939 dated Jan. 13, 2017.
Jennewein et al., Quantum Cryptography with Entangled Photons. Phys Rev Lett. May 15, 2000;84(20):4729-4732.
International Search Report and Written Opinion dated Dec. 12, 2014 in PCT/US2014/039017 (9 pages).

* cited by examiner

INCORRUPTIBLE PUBLIC KEY USING QUANTUM CRYPTOGRAPHY FOR SECURE WIRED AND WIRELESS COMMUNICATIONS

The present invention is filed under 35 U.S.C. § 371 as the U.S. national phase of International Application No. PCT/US2014/039017, filed May 21, 2014, which designated the U.S. and claims priority to U.S. Provisional Patent Application No. 61/826,926, filed May 23, 2013, which is hereby incorporated in its entirety including all tables, figures and claims.

FIELD OF THE INVENTION

The present invention relates to the field of communications, both wired and wireless and more particularly to securing such communications by means of encryption.

BACKGROUND OF THE INVENTION

The following discussion of the background of the invention is merely provided to aid the reader in understanding the invention and is not admitted to describe or constitute prior art to the present invention.

Encryption techniques have existed for thousands of years as a way to securely convey messages from one party to another. The process begins with the original message, called the plaintext message, being encrypted using a shared secret key. The key is meant to be known only to the party sending the message and the party receiving the message. Once encrypted, the message is difficult to decrypt without the encryption key. If the message were intercepted, an eavesdropper would be unable to decrypt the message or forge the message without significant effort since they do not know the encryption key. However, once the receiving party receives the encrypted message, they could decrypt the message quickly with the shared secret key to reveal the original plaintext message.

As computers developed toward the end of the twentieth century, it became much easier to decrypt messages. One method, known as "brute force," utilized the processing power and speed of computers to decrypt a message by using random combinations of decryption keys. To use this method, an eavesdropper could intercept a message and quickly decrypt it if the eavesdropper's computer was sufficiently fast. This led to a competition between message-encryption techniques and message decryption—or cracking/hacking—techniques that continues to this day.

In the late 1970's, an encryption technique was developed based on the assumption that certain mathematical problems are challenging for computers to perform in reverse. Factoring prime numbers is one example. A computer can quickly compute that 179×181=32,399. However, it is much harder for an eavesdropper's computer to determine which two numbers can be multiplied together to equal 32,399 (a process called factoring). If the sender and receiver both share a knowledge of at least one of the numbers used in the factoring process (i.e. 179 or 181 in the example above) then it becomes simple for them to determine the other factored number and to recreate the encryption key utilized in encrypting the message. However, for an eavesdropper with no knowledge of either number, the eavesdropper's computer must try many, many more combinations and, therefore, it will take a long time for the eavesdropper to ultimately decrypt the message.

Consequently, encryption algorithms based on factoring methods were developed in the 1970's to create encryption solutions that could quickly be encrypted and decrypted by trusted parties—and were difficult to crack or decrypt by eavesdroppers with existing computational resources. As computational power grew, however, these algorithms became easier to defeat and larger and larger factored numbers were needed. Currently, 128-bit (numbers as large as $10^{38}$) are used for secure encryption over the Internet. These numbers are so large that typical computational resources are considered insufficient to crack this encryption within a reasonable amount of time. However, as computational resources increase, this number will need to be raised to 256-bit encryption, and then 512-bit, and so on. As such, encryption based on mathematical complexity is always vulnerable to computational advances and is not considered "future proof."

Increasing the encryption complexity also creates an added burden on the message sender and receiver. To ensure secure communications, the sender and receiver must have the necessary computational power to implement the latest encryption and decryption methods. Likewise, their messages will be delayed by a certain amount of time —an effect referred to as "data latency"—as the message is encrypted and/or decrypted. For certain applications, these computational resources may not be available and/or the data latency introduced may be unacceptable. For applications where the hardware is deployed for many years, the on-board computational resources may be appropriate at the time of deployment but can quickly become antiquated and incompatible as newer requirements on encryption emerge.

One such application is in the field of distributed automation for infrastructure control. In many countries, the control of critical resources—like electricity, water, oil & gas, etc.—is controlled by a coordinated network of distributed machines. These machines often rely upon public communication channels—i.e. the Internet—to communicate (called machine-to-machine, or M2M, communications) and, therefore, are highly vulnerable to message interception and decryption. While robust methods of cyber security have been developed and are in use today for telecom applications (such as Internet financial transactions), these same techniques are unsuitable for M2M communications. As mentioned, M2M communications are used in the real-time control of distributed equipment and thus must impose strict requirements on data latency and message protocols. These requirements, unfortunately, make it impossible to use traditional methods of data authentication and encryption.

As an example, a data latency of less than 4 milliseconds is required for emergency-level announcements of electrical grid control equipment—such as a Remote Terminal Unit (or RTU) communicating with a Supervisory Control and Data Acquisition System (or SCADA). If the RTU takes too long to announce the emergency condition, an opportunity to respond to the emergency situation, and to limit damage to the system, will be compromised. With encryption methods based on mathematical complexity, the encryption process alone typically requires more than 4 milliseconds to encrypt, even for a short message, making this method of data protection incompatible with the needs of the electrical grid.

Because of the lack of compatible encryption options, many automated infrastructure systems communicate using weak encryption solutions or no encryption at all. This makes these critical infrastructure systems a relatively easy target for cybernetic attacks, hacking, and/or espionage known as "cyber attacks." Of particular sensitivity is the North American electrical grid structure. Given the demand for electricity in the United States, the aging North American electrical grid requires automatic machine control in order to deliver the quantity and quality of electricity demanded in the United States. Studies by various United States government agencies and United States universities have estimated that a successful wide-scale cyber attack on the United States' electrical grid could cripple the country's financial, governance, and military capabilities for several months. With the number of successful cyber attacks increasing each year—and a growing number of countries developing sophisticated cyber warfare programs —infrastructure protection and secure machine-to-machine communications has become an urgent priority.

One method of encryption that has been developed over the past two decades that is not based on mathematical complexity is a technique called quantum encryption or quantum cryptography. Quantum cryptography delivers message security through physics rather than mathematical complexity. Examples of quantum cryptographic methods are disclosed in U.S. Pat. No. 7,831,048 to Kastella, et al.; WO/2012/044855 to Hughes et al., and US20130084079 to Nordholt et al.

In general, quantum encryption techniques using entangled photons have found limited adoption with telecommunication networks because they require dedicated optical communication links between the sending and receiving parties. The sending and receiving parties must each physically (through optical components) receive a photon prepared in a quantum superposition state and must either measure or act upon it. This requirement means that the communication channel between the two parties must be established to be "quantum friendly." Therefore, it must not disturb—or decohere—the quantum state of the entangled photon. Unfortunately, photons decohere very easily which makes them unsuitable for use over traditional fiber optic networks where fiber optic switches, routers, and repeaters are often encountered.

Therefore, there is a need for a method of encryption that can provide for secure communications that are difficult to decrypt and can operate with an acceptable latency such that they will function within the parameters demanded by the systems within which they operate.

SUMMARY OF THE INVENTION

It is an object of the present invention to provide a hardware system that generates encryption keys based on quantum mechanical phenomena that can be delivered directly, over public wired and wireless channels, to communicating devices. In a related object, the present invention further provides methods for the provision and use of such a hardware system in order to provide an encryption method. The encryption strength provided by the claimed invention is derived from physical phenomena and not mathematical complexity and, therefore, is "future proof" against advances in computational power. The present invention allows pre-existing networked devices to communicate securely within a geographically defined "protection zone." In certain aspects, the invention provides a geographically-defined region—or "protection zone"—within which communications from one recipient in the zone can be securely transmitted to another recipient within the same zone.

In a first aspect, the present invention relates to systems for generating a public key for use in an encryption method. These systems comprise:

a photon source configured to generate quantum entangled bi-photons;
an optical switch operably coupled to at least four fiber optic transmission lines;
at least four remote receiver units, each coupled to one of the fiber optic transmission lines; and
a first processing component operably coupled to the optical switch;
a first server component, coupled to the first processing component;
a second server component, consisting of at least four server components, each coupled to one of the remote receiver units; and
one or more client processing systems which are operably linked to each of the at least four server components to send data requests to the server components and receive data from the server components in response thereto, and to construct the public key using the received data.

As described hereinafter, the optical switch is configured to receive the bi-photons from the photon source and transmit each bi-photon as a first and a second quantum entangled photon along separate fiber optic transmission lines to which the optical switch is coupled, the first processing component is configured to control the optical switch to determine which fiber-optic transmission line transmits the first quantum entangled photon and which fiber-optic transmission line transmits the second quantum entangled photon, and to store in a memory device associated with the first processing component information indicative of the determination, each remote receiver unit comprises a second processing component configured to measure one or more quantum states of photons received over the fiber-optic transmission line to which it is coupled and to store in a memory device associated with the second processing component information indicative of the quantum state(s) measured, each of the second server components is configured to respond to data requests from the one or more client processing systems for the information indicative of the quantum state(s) measured by the remote receiver unit to which it is coupled by retrieving the information indicative of the quantum state(s) measured from the memory device associated with the second processing component and transmitting the information to the one or more client processing systems, and the first server component is configured to receive information from and respond to requests from the one or more client processing systems to validate that the quantum state information retrieved from each remote receiver is properly correlated with the configuration of the optical switch prepared for each entangled photon pair and transmitting the validation, or invalidation, to the one or more client processing systems.

The quantum entangled bi-photons generated by the system may be entangled in terms of their state of polarization, their momentum, their spectral characteristics (or "color"), their spatial degrees of freedom, or their temporal characteristics. Devices and methods for generating such entangled photon pairs are known in the art, and examples are described hereinafter. In systems in which a plurality of bi-photon pairs are used to establish an encryption key, each bi-photon pair may be, but need not be, entangled with regard to the same characteristic.

As noted above, the systems described herein may describe a geographically—defined "protection zone" which is based on the distance of each server component from the optical switch. In certain embodiments, at least one server component, and preferably each server component, is distributed at a distance of at least 1 kilometer, preferably at least 2 km, more preferably at least 5 km, still more preferably at least 10 km, and most preferably at least 25 km or more, from the optical switch. The one or more client processing systems are preferably distributed within this "protected zone" (for example, at a distance from the optical switch which is less than the distance each server component is distributed from the optical switch).

The fiber optic transmission lines can cause difficulties in maintaining the quantum entanglement of bi-photon pairs. By way of example, ideal optical fibers have a perfectly circular cross-section. In this case, the fundamental mode has two orthogonal polarizations that travel at the same speed. In the real world, however, optical fibers are seldom, if ever, ideal. Random imperfections and stresses within the cable can break the circular symmetry, causing the changes in the polarization propagating through the fiber. In this case, the two polarization components of a signal will slowly separate. A system can comprise active polarization compensation to sense or mitigate changes in polarization rotation in the optical fiber. Active polarization compensation periodically measures the changes in polarization state throughout the transmission process, and can adjust "rotators" along the optical path to compensate for the changes.

Encryption refers to the process of converting an original message into a form that is unreadable to unauthorized individuals; decryption refers to the process of converting the encrypted message into an easily read message. As described herein, the one or more client processing systems are configured to perform the programmatic steps required to encrypt and/or decrypt messages, including but not limited to generating an encryption key for use in encrypting and/or decrypting data for the encryption method. This can comprise processing the public key together with a shared secret key stored on the one or more client processing systems using a Boolean function. While described hereinafter with regard to the use of OR and XOR functions in generating an encryption key (and decrypting data with the inverse XOR or OR function), this is not meant to be limiting.

In a related aspect, the present invention provides methods of encrypting and decrypting a communication sent from a first processing component to a second processing component, where the first and second processing components each comprise a shared secret key. These methods comprise:

submitting a request for data from the first processing component, and submitting a request for data from the second processing component, to a system for generating data from quantum entangled bi-photons, the system comprising
a photon source configured to generate the quantum entangled bi-photons,
an optical switch operably coupled to at least four fiber optic transmission lines,
at least four remote receiver units, each coupled to one of the fiber optic transmission lines, and
a third processing component operably coupled to the optical switch, and
a first server component, coupled to the third processing component;
a second server component, coupled to at least four server components, each coupled to one of the remote receiver units,
wherein the optical switch is configured to receive the bi-photons from the photon source and transmit each bi-photon as a first and a second quantum entangled photon along separate fiber optic transmission lines to which the optical switch is coupled,
wherein the third processing component is configured to control the optical switch to determine which fiber optic transmission line transmits the first quantum entangled photon and which fiber optic transmission line transmits the second quantum entangled photon, and to store in a memory device associated with the third processing component information indicative of the determination,
wherein each remote receiver unit comprises a fourth processing component configured to measure one or more quantum states of photons received over the fiber optic transmission line to which it is coupled and to store in a memory device associated with the fourth processing component information indicative of the quantum state(s) measured;
wherein the first server component is configured to receive information from and respond to requests from the one or more client processing systems to validate that the quantum state information retrieved from each remote receiver is properly correlated with the configuration of the optical switch prepared for each entangled photon pair and transmitting the validation, or invalidation, to the one or more client processing systems.

receiving at the first processing component from each server component in the system information indicative of the quantum state(s) measured by the remote receiver unit to which it is coupled in response to the request for data;

transmitting from the first and second processing component the information from the remote receiver units to the first server component;

receiving at the first server component information from the first and/or second processing systems and validating that the received quantum states correlate with the configuration of the optical switch prepared for each entangled photon pair and transmitting validation, or invalidation, of the received information to the first and/or second processing system;

receiving validation of the public key from the first server component and generating at the first processing component a public key using the received data;

receiving validation of the public key from the first server component and generating at the second processing component the public key using the received data;

encrypting the communication at the first processing component using an encryption key generated by processing the public key together with the shared secret key using an irreversible Boolean function and encrypting the outgoing data using this resulting key using a reversible Boolean function;

transmitting the encrypted communication from the first processing component to the second processing component; and decrypting the encrypted communication at the second processing component using an encryption key generated by processing the public key together with the shared secret key using an irreversible Boolean function and decrypting the incoming data using the inverse of the reversible Boolean function.

BRIEF DESCRIPTION OF THE DRAWINGS

The foregoing and other features of the present invention will become apparent to one skilled in the art to which the present invention relates upon consideration of the following description of the invention with reference to the accompanying drawings. Other embodiments of the invention will be apparent from the following detailed description, figures, and claims.

DETAILED DESCRIPTION OF THE INVENTION

Figure 1:
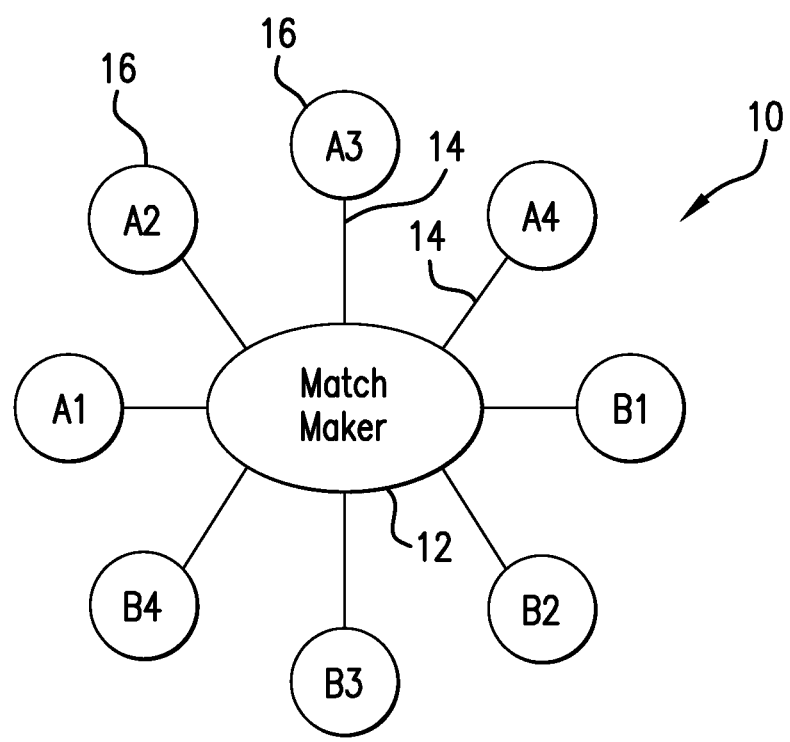
FIG. 1 depicts a quantum source, optical fibers, and several receivers that make up an "incorruptible public key."

Entangled photons are twin photons that are created at exactly the same moment in time. Their features (e.g., their color, momentum, and/or polarization) cannot be determined without measuring them, but their relationship to one another in a certain basis (or measurement reference frame) is always known, as is the relationship between their properties. By measuring the properties of one photon one can determine the corresponding properties of the other photon, even if the two photons are separated by a physical distance.

By way of example, one blue laser photon might create a twin pair of entangled photons—one of the pair being red and the other being green—in a certain measurement basis. Which photon is red and which is green cannot be known without measuring them both in the measurement basis in which they were originally prepared. However, the knowledge that one is red and one is green is guaranteed by the laws of quantum mechanics. Such photons are referred to as "entangled photons."

Entangled photons can be used for a quantum cryptography solution because the entangled photons can be separated and sent to different parties wanting to communicate securely. If one photon is sent to one communicator (Alice) and the other is sent to another communicator (Bob), each recipient can measure their photon in a particular basis and record its value. After many photons have been transmitted, Bob and Alice will each have a random collection of measurements (e.g., red or green from the example above). In instances where they have chosen the correct measurement basis, the photon features (i.e. red or green) will be correlated with one another—meaning they will always be opposite of one another. For these measurements, the red and green photons can be treated as 0s and 1s and can form an encryption key that the two parties—and only the two parties—now share. The encryption key can then be used to encrypt a message and send it over public channels. The key generated can optionally or additionally be utilized in standard encryption protocols, such as Data Encryption Standard (DES), Triple-DES, International Data Encryption Standard (IDEA), or Advanced Encryption Standard (AES).

Leveraging the inherent security offered by quantum cryptography methods, the present invention creates an "incorruptible public key" that can be distributed through public wired and wireless channels. The incorruptible public key can be used by distributed control equipment which possess a shared private key to securely communicate messages with little to no time required for the encryption and decryption processes. This technique does not produce shared secret encryption keys but, rather, provides a common key which cannot be corrupted and can be used to increase and amplify the privacy of already-established shared private keys. In addition to protecting and diversifying established shared private keys, this technique can be used in tandem with other key management solutions to securely distribute new symmetric keys.

FIG. 1 depicts an aspect of the present invention by which the entangled photons are generated and each one of the pair of bi-photons is transmitted to particular receivers within the system 10. The source of quantum entangled photons is prepared at a hub (also referred to herein as a "matchmaker") 12 and the entangled photons are then distributed through dedicated optical fibers 14 to specific receivers 16. The hub and receivers comprise a system to create and store an "Incorruptible Public Key."

Figure 2:
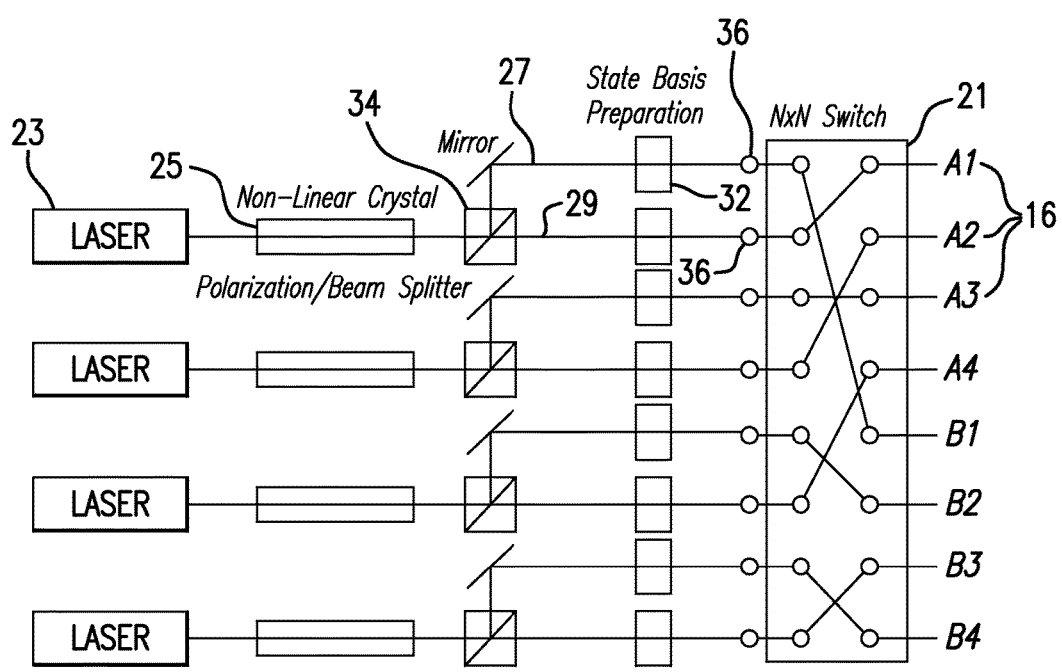
FIG. 2 depicts the workings of a quantum source of entangled photons prepared for use with an "incorruptible public key."

FIG. 2 depicts the design and an example of the hub of the present invention. According to the present invention, the hub serves as a matchmaker by using an optical switch 21 to change which two receivers are receiving one of the photon pairs. As an example of one aspect of the present invention, as illustrated in FIG. 2, a coherent source of excitation light (i.e. a laser) 23 is focused into a non-linear material (for example, periodically-polled KTP crystal) 25. Some of the photons from the excitation light down-convert through spontaneous parametric down-conversion to create a bi-photon 27 and 29. Depending on how the excitation light and the non-linear material are designed, the bi-photons produced can be designed for eventual entanglement either spatially, spectrally, temporally, or through their polarizations based upon the state basis of preparation by a variety of methods known to those of ordinary skill in the art, shown schematically in FIG. 2 as 32. A person of ordinary skill in the art will readily appreciate that embodiments of the invention could be based on variations in how these photons are produced and entangled.

The produced bi-photons are separated from the excitation light through optical filters before being split into two separate polarization paths by a beam splitter 34 —resulting in two outputs 36. After the pair of bi-photons are split, each one will travel down a separate path and any adjustments to the quantum state made through a "state basis preparation" stage 32. As one non-limiting example of one such basis, one of ordinary skill in the art would readily apprehend that for polarization entanglement, this stage would simple by a polarization waveplate oriented along a certain axis (typically +45° or −45° from the linear polarization axis of the entangled photons). A person of ordinary skill in the art would readily apprehend that, as illustrated schematically in FIG. 2, a variety of different state bases of preparation could be employed in the system to further increase and enhance the complexity of the encryption.

It should also be noted that the system can be based on various forms of entanglement. Although polarization entanglement is described in the prior system description, the same basic system functionality could be achieved with temporal, spectral, or spatial entanglement. For temporal entanglement, a double pulse of laser light would be produced by a path-mismatched Michelson interferometer and injected into the non-linear crystal to produce two temporally separated events that could produce down converted photons. A high speed switch would then be used to direct the photons from each temporal event window into a different fiber optic line. A second path-mismatched Michelson interferometer would then be used to measure and time-stamp the quantum state of the received photon at each receiver. For spectral entanglement, monochromatic laser light would be converted into entangled photon pairs with different spectral properties. A dual path interferometer would provide separate paths for the entangled photons to travel down based on their spectral properties. The two photons would then be separated through a beamsplitter and directed down different optical fibers to receivers. The receivers would use a dichroic mirror and two detectors to determine the spectral properties of the received photons. Comparison of the time-stamped measurements would be used to identify correlations. For spatial entanglement, laser light would be downconverted in the non-linear crystal into a multi-mode spatial output. A mode selection device—such as a pinhole—would be used to isolate various correlated modes and inject them into optical fibers. Correlations between time-stamped measurements of photon arrival at the receiver would then be conducted to confirm entanglement.

As is illustrated in FIG. 2, each one of the pair of entangled photons is sent to a separate receiver through a fiber optical N×N switch 21. By way of example illustrated by FIG. 2 the laser 23 generates the bi-photons 27 and 29 which are the subjected to a particular state basis of preparation 32 to create the output of a pair of entangled photons 36. The pair 36 then passes into a fiber optical N×N switch 21, which sends each one of the pair of entangled photons to particular receivers 16. As illustrated in FIG. 2, by way of non-limiting example the pair generated by the laser 23 generating the bi-photons 36 are sent to receivers A1 and B1. In one embodiment of the present invention, the fiber optical switch 21 is constantly reconfiguring the connections between the various inputs and outputs—meaning that as a person of ordinary skill in the art would apprehend from FIG. 2, the entangled photons from the same source would be sent to different pairs of receivers from one moment to the next. Although the example illustrated in FIG. 2 shows 4 sources generating 4 pairs of bi-photons, creating 8 outputs going to 8 separate receivers, which would require an 8×8 fiber optical switch, a person of ordinary skill in the art would readily apprehend that the present invention is not limited to such an arrangement: a single or multiple sources could be used with one or more receivers and that the N×N switch can and would be adopted to that system.

As an aspect and preferred embodiment of the present invention, the N×N switch 21 changes which particular receivers 16 receive each of the entangled photons over time. In the example shown in FIG. 2, the bi-photons from the top source are sent to receivers A1 and B1, those of the next source to A3 and A2, those of the next to receivers A4 and B2, and the last are sent to receivers B4 and B3. In a preferred embodiment of the present invention, the fiber optical switch 21 thereafter is reconfigured so that, for example, the bi-photons from the top source are sent to receivers A3 and B2, those from the next source to B3 and B1, etc. A microprocessor controls the configuration of the N×N fiber optic switch and stores its configuration at any given time in memory. Only the matchmaker's microprocessor has knowledge of which particular receivers 16 have received a specific matching entangled photon from a specific entangled pair generated and should, therefore, have outputs that are correlated.

The receivers 16 are located a distance (e.g., 20 km depicted in FIG. 2) from the matchmaker hub and perform a simple measurement operation. They measure their received photons on a particular, but randomly changing, basis and then report their measurement results and basis publicly over the Internet or other classical communication channel. A microprocessor in the receiver stores all measurements and uses an embedded server to make these measurements available. In preferred embodiments of the present invention, a wired Local Area Network (LAN) connection or a wireless network connection is used for posting this data on a network from the embedded servers.

In a preferred embodiment of the present invention, eight receivers span out radially, sitting on the perimeter of a fixed-diameter geographic area. This area is referred to as the "protected zone." For devices within the protected zone, the output from any receiver can be reached through the existing public wired and wireless routers that already exist for managing Internet traffic. As a person of ordinary skill in the art understands, in a preferred embodiment of the present invention, the output from any one receiver is acquired similarly to how data is acquired for a web page; the receiver acts as a small web server.

Figure 3:
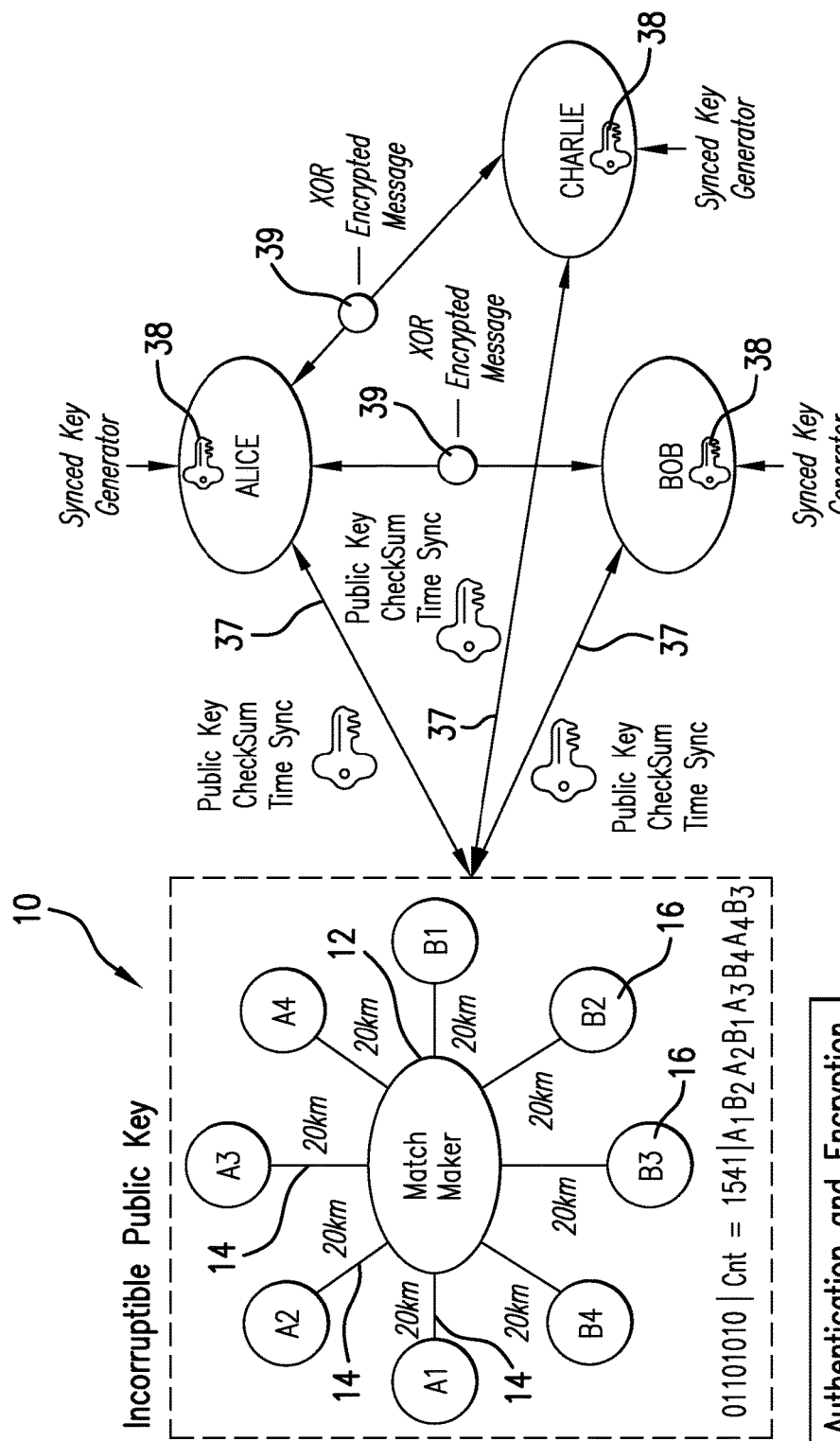
FIG. 3 depicts an incorruptible public key and devices utilizing that key to communicate securely.

In a preferred embodiment of the present invention depicted in FIG. 3, the Incorruptible Public Key system is then utilized using an encryption method. As part of that method, a device needing to send a secured message would first query each Incorruptible Public Key receiver 16 to acquire the public key 37 that its future communications would be based on. Assuming the device has an Internet Protocol (IP) address that has been registered with the Incorruptible Public Key receiver 16 (i.e., it has an active subscription), the device would be allowed to poll and download the latest generated Incorruptible Public Key data. Each receiver's output would be polled, downloaded, and concatenated—using a standardized order—to form a long string of random bits. To verify that the constructed string of random bits had not been tampered with, the device would send the concatenated bit string to the Matchmaker 12, or hub, for verification. If the arrangement of bits within the concatenated bit string properly matched the correlations prepared by the Matchmaker 12, then the bit string would be validated and used by the device for encryption.

The key 37 is said to be "incorruptible" because any attempt to intercept and measure the photons traveling to each receiver pair would be quickly detected by the Matchmaker 12 when the outputs were correlated, because, as discussed before, interception and measurement of the entangled photons would destroy the correlation between the matched receivers 16 and would indicate tampering. Furthermore, any effort to falsify the output of the receivers would be unsuccessful without knowing how each receiver pair was matched, something only the Matchmaker 12 knows. Falsifying one receiver's output (from say zero to one) would only go undetected if its corresponding receiver pair was also simultaneously changed (from one to zero).

Similarly, any effort to falsify the output from a receiver 16 by IP spoofing techniques would require that the entire network of routers within the protected zone be hacked. Since there could be thousands of routers within the protection zone, simultaneously hacking these routers would be extremely difficult. If achieved, this would represent a public communication crisis with implications far greater than the securing of machine-to-machine communications and is assumed to be unlikely.

With an Incorruptible Public Key 37, communicating parties now have a validated third party upon which to base their encryption. This is similar to how Internet transactions use Trusted Third Party certification to distribute asymmetric keys for secure transactions. The critical difference is that the Incorruptible Public Key 37 has used quantum phenomena to generate and distribute (without the possibility of tampering) a true random bit string that can be used for encryption.

The term "OR" refers to the logical function known to those of ordinary skill in the art as "OR." It returns a value of "true," whenever any value examined is true. When used with binary digits, OR returns a result of 1 if either of the two digits compared has a value of 1. For example, 01011 OR 11000=11011.

The term "XOR" refers to the logical function known to those of ordinary skill in the art as "XOR," or the exclusive or. It returns a value of true if the inputs compared differ (one being true and the other being false). When used with binary digits, XOR returns a value of 1 if the two compared digits differ (are 0 and 1). For example, 01011 XOR 11000=10011.

FIG. 3 also depicts, schematically, how by acquiring this public key 37 and performing a simple logic function, a device can OR the Incorruptible Public Key 37 with a secret internal key 38 to produce a non-reversible encryption key. The secret key 38 is selected from a catalogue of shared secret keys that are shared by each trusted device communicating on the network. The secret key catalogue is held in physical memory that is installed on each device on the network during manufacturing. This shared secret key catalogue confirms that this device originated from a particular manufacturer and is installed in a particular region. Although this example utilizes the logical or Boolean operators OR and XOR, many different operators are known to those of ordinary skill in the art, as are many different ways to utilize the generated keys to encrypt messages. Persons of ordinary skill in the art will readily apprehend that the present invention is not limited to utilizing the Boolean operators OR and/or XOR and could be used with a variety of Boolean operators and higher-order encryption techniques. The use of the operators and simple encryption process in the example is in no way limiting of the present invention and is utilized for simplicity of illustration and because as discussed herein, existing installed networked devices all have transistors that can quickly and easily perform OR and XOR functions. The inventor contemplates that installations and applications of the present invention can and will use other, and potentially varying over time, operators and encryption techniques with the present invention.

The secret key 38 OR-ed with the Incorruptible Public Key 37 produces a new key, akin to a one time pad. This process is an irreversible mathematical process so, even knowing the Incorruptible Public Key 37, an eavesdropper cannot determine the secret key. This process allows secret keys to be protected from detection and provides a method for diversifying the secret key codebook. The OR-ed key can then be used with a number of existing symmetric key encryption methods known to those of ordinary skill in the art to encrypt the plaintext message that is to be sent.

A simple example of this encryption would be a simple logic operation, XOR-ing, to encrypt the message 39. The encrypted message 39 would then be transmitted to a receiving party that shares the same secret key catalogue and had also downloaded the same incorruptible public key 37. The receiver—and only the receiver—then has all the necessary information to quickly decrypt the received message.

In a simplified and brief example of how a preferred embodiment of the present invention would operate, the Incorruptible Public Key receivers 16 publish the latest key 37, with its time stamp; the key is 10110010. Alice and Bob both simultaneously download that key 37 for their upcoming communication, and send it to the Matchmaker 12 for verification. The Matchmaker 12 verifies the Incorruptible Public Key 37 by checking that known correlations are maintained, for example "bit1≠bit4, bit2≠bit7, bit3≠bit5, bit6≠bit8," and sends that verification to Bob and Alice.

Alice wants to send a message to Bob that is 00001100 in plain text. Alice looks up the private key 38 corresponding to the Incorruptible Public Key 37 (10110010) in the private key catalog. For purposes of this example, that private key 38 is 00110101. That key 38 is then OR-ed with the Incorruptible Public Key 37, to create the OR-ed Key: 10110010 OR 00110101=10110111. Alice then XORs that OR-ed Key with the plaintext message to create the encrypted message 39: 10110111 XOR 00001100=10111011. Alice sends her encrypted message, 10111011, to Bob.

Bob downloads and verifies the Incorruptible Public Key 37, as noted above. Bob also looks up his private key 38 corresponding to the Incorruptible Public Key 37, and obtains the private key 38, which he also ORs against the Incorruptible Public Key 37 to obtain the OR-ed Key for this messaged, 10110111. Bob then XORs the OR-ed Key for this message against the encrypted message 39 and obtains the plaintext message: 10110111 XOR 10111011=00001100.

If an eavesdropper were to intercept an encrypted message 39, they would be unable to decrypt the message because they did not have access to the public key 37 or the shared secret key 38. If they had access to the public key 37, but not the shared secret key 38, they still would not be able to decrypt the message 39, as both are needed to reconstruct the original OR-ing process used in creating the encryption key. If they intercepted the message 39 and stored it for later replay, or re-transmission to Bob, for example (a common hacker attack), the message would be invalid at future times because the public key 37 would have changed and, therefore, the resulting encryption key would have changed. If an eavesdropper monitored several subsequent transmissions to try and learn the shared secret key catalogue, they would be unsuccessful because each transmission would use a new random public key 37.

The inherent security delivered by the present invention provides a robust, compatible encryption scheme that is immediately applicable to machine-to-machine communications. Because the encryption strength is not based on mathematical complexity, there is no delay associated with the encryption process and the process is "future proof" against new advances in computing. The logical OR-ing and XOR-ing of data used in the encryption is a simple, single transistor function that every deployed legacy product can perform without the introduction of data latencies.

Importantly, the encryption method of the present invention can be utilized by equipment located within the protection zone defined by the Incorruptible Public Key hardware and does not require any special equipment to be installed on the communicating devices. The equipment does not need to physically transmit, receive or measure any quantum entangled photons. The encryption solution is available over public communication channels and can be accessed over wired LAN or wireless network services.

Equipment lying outside of the protected zone, however, cannot be protected because data from the Incorruptible Public Key is accessed through a much smaller number of in-line routers. This creates a single-point vulnerability for IP spoofing attacks to learn details of the equipment's shared secret keys and to successful falsify communications. Consequently, additional Incorruptible Public Keys must be built to protect larger and larger areas.

It should be noted that this technique does not prevent an attack from occurring. The present invention merely detects, with high certainty, that an attack or hacking has been attempted and alerts the transmitter and receiver of this intrusion. This capability, however, is highly desirable for machine-to-machine communications. Attacks would have little to no impact on a control system when detected quickly and reliably.

The present invention presents a quantum encryption solution to be offered for wired and wireless equipment, based on physical phenomena and not mathematical complexity and therefore "future proof" against advances in computational power. The present invention requires minimal computational resources, and it can simultaneously serve multiple clients (not just peer-to-peer communications). The present invention is particularly well-suited to securing machine-to-machine communications.

What is claimed is:

1. A system for generating a public key for use in an encryption method, comprising:
   a photon source configured to generate quantum entangled bi-photons;
   an optical switch operably coupled to at least four fiber optic transmission lines;
   at least four remote receiver units, each coupled to one of the fiber optic transmission lines; and
   a first processing component operably coupled to the optical switch;
   a first server component, coupled to the first processing component;
   at least four second server components, each coupled to one of the remote receiver units; and
   one or more client processing systems which are operably linked to each of the at least four second server components to send data requests to the second server components and receive data from the second server components in response thereto, and to construct the public key using the received data,
     wherein the optical switch is configured to receive the bi-photons from the photon source and transmit each bi-photon as a first and a second quantum entangled photon along separate fiber optic transmission lines to which the optical switch is coupled,
     wherein the first processing component is configured to control the optical switch to determine which fiber-optic transmission line transmits the first quantum entangled photon and which fiber-optic transmission line transmits the second quantum entangled photon, and to store in a memory device associated with the first processing component information indicative of the determination,
     wherein each remote receiver unit comprises a second processing component configured to measure one or more quantum states of photons received over the fiber-optic transmission line to which it is coupled and to store in a memory device associated with the second processing component information indicative of the quantum state(s) measured,
     wherein each of the second server components is configured to respond to data requests from the one or more client processing systems for the information indicative of the quantum state(s) measured by the remote receiver unit to which it is coupled by retrieving the information indicative of the quantum state(s) measured from the memory device associated with the second processing component and transmitting the information to the one or more client processing systems, and
     wherein the first server component is configured to receive information from and respond to requests from the one or more client processing systems to validate that the quantum state information retrieved from each remote receiver is properly correlated with the configuration of the optical switch prepared for each entangled photon pair and transmitting the validation, or invalidation, to the one or more client processing systems,
     wherein each client processing system of the one or more client processing systems is configured to generate the public key by
       obtaining from each of the at least four remote receivers the information indicative of the quantum state(s) measured by each remote receiver,
       using the information obtained thereby to produce a string of random bits, and
       obtaining the validation or invalidation of the string of random bits from the first server component,
       wherein the public key is identified as being the string of random bits upon its validation by the first server component.

2. A system according to claim 1, wherein at least one of the quantum entangled bi-photons are polarization entangled.

3. A system according to claim 1, wherein at least one of the quantum entangled bi-photons are momentum entangled.

4. A system according to claim 1, wherein at least one of the quantum entangled bi-photons are spectrally entangled.

5. A system according to claim 1, wherein at least one of the quantum entangled bi-photons are spatially entangled.

6. A system according to claim 1, wherein at least one of the quantum entangled bi-photons are temporally entangled.

7. A system according to claim 1, wherein at least one second server component is distributed at a distance of at least 1 kilometer from the optical switch.

8. A system according to claim 2, wherein active polarization compensation is used to sense or mitigate changes in polarization rotation in the optical fiber.

9. A system according to claim 7, wherein the one or more client processing systems are each distributed at a distance from the optical switch which is less than the distance each second server component is distributed from the optical switch.

10. A system according to claim 1, wherein the one or more client processing systems are configured to generate an encryption key for use in encrypting and/or decrypting data for the encryption method by processing the public key together with a shared secret key stored on the one or more client processing systems using a Boolean function.

11. A system according to claim 10, wherein the Boolean function is an OR function for use in generating an encryption key.

12. A system according to claim 11 wherein the encryption key is used with a Boolean XOR function to encrypt the outgoing data and an XOR function for use in decrypting incoming data.

* * * * *